United States Patent
Holm

[15] 3,637,016
[45] Jan. 25, 1972

[54] METHOD FOR IMPROVING THE INJECTIVITY OF WATER INJECTION WELLS

[72] Inventor: LeRoy W. Holm, Fullerton, Calif.

[73] Assignee: Union Oil Company of California, Los Angeles, Calif.

[22] Filed: Apr. 20, 1970

[21] Appl. No.: 30,241

[52] U.S. Cl. .......................................................... 166/273
[51] Int. Cl. ........................................................ E21b 43/22
[58] Field of Search ........................................ 166/273–275

[56] References Cited

UNITED STATES PATENTS

| | | | |
|---|---|---|---|
| 2,738,325 | 3/1956 | Rydell | 166/275 |
| 3,297,085 | 1/1967 | Herring | 166/273 |
| 3,460,622 | 8/1969 | Davis | 166/273 X |
| 3,467,188 | 9/1969 | Gogarty | 166/274 |
| 3,474,865 | 10/1969 | Gogarty et al. | 166/275 X |
| 3,500,922 | 3/1970 | O'Brien et al. | 166/273 |

*Primary Examiner*—Ian A. Calvert
*Attorney*—Milton W. Lee, Richard C. Hartman, Lannas S. Henderson, Dean Sandford and Robert E. Strauss

[57] ABSTRACT

The injection rate of water into an injection well that exhibits low injectivity because of oil saturation in the formation adjacent to the well can be increased by alternately introducing into the well a series of successive small quantities of substantially anhydrous soluble oil and low salt-content water, and thereafter injecting flood water through the well and into the formation. This technique is particularly useful for improving the injectivity of wells penetrating relatively thick and/or heterogeneous formations.

15 Claims, No Drawings

METHOD FOR IMPROVING THE INJECTIVITY OF WATER INJECTION WELLS

This invention relates to the recovery of oil from subterranean reservoirs by a waterflood process. More specifically, this invention relates to improving the injection rate of water into input wells in a waterflood process.

It has long been recognized that substantial amounts of oil remain unrecovered at the completion of normal primary recovery operations. In order to improve the recovery of oil, it is common practice to supplement the native reservoir energy by various means including the use of water to displace oil from a formation, which process is conventionally called waterflooding. A waterflood process, briefly, comprises introducing water, which may be an oil field brine or other high salt-content water, into a formation through at least one input well, forcing the water through the formation toward at least one output well, and recovering through the output well the oil that is displaced from the formation by the water.

One of the principal problems encountered in waterflooding is the economical injection of a sufficient quantity of water to carry out the process. Reduced water injectivity can be caused by the presence of oil in the formation around the input well. A condition of oil saturation in porous rock material substantially reduces the effective permeability of the rock to the flow of water, necessitating increased injection pressures to force the water into the formation. The higher pressure not only increases the cost of injecting water, but in many fields the injection rates are limited because of pressure limitations of the well casings or because the fracturing pressure of the formation cannot be exceeded.

It has heretofore been proposed to increase the permeability of the formation around the well to water by reducing the oil saturation of the formation. Specifically, it has been proposed that oil saturation be reduced by injecting solvents such as carbon dioxide, acetone, ethyl alcohol, isopropyl alcohol, n-propyl alcohol, alkyl alcohol, diacetone alcohol, butyl cellosolve, butyl carbitol, dioxane, liquid ammonia and alternate slugs of liquid hydrocarbon and liquid ammonia. While these solvents are more or less effective in reducing oil saturation in the formation, excessive quantities of solvent are required to completely remove the oil. Also, many of the suggested solvents are expensive.

It has also been proposed to reduce oil saturation in the formation adjacent to an injection well by treating the well with soluble oils or micellar dispersions formed by adding water to a soluble oil. While such treatments have been successful in improving the injectivity of wells used for the injection of relatively fresh water, i.e., water low in salt content, and particularly water having a low content of polyvalent cations, these treatments have not been as successful in improving injection rates in wells used for the injection of brine, such as the typical oil field brines employed in many water flooding operations.

Further, often waterfloods are conducted in formations having relatively thick pay zones, and/or in heterogeneous formations, i.e., in formations having strata of varying permeabilities, or which are fractured, so that liquids injected through a well penetrating the formation are not uniformly distributed within the formation. In treating such formations to improve water injectivity, the solvents introduced into the well preferentially pass through the more permeable strata rendering these strata even more permeable to subsequently injected water, but do not effect substantial treatment of the less permeable zones. Thus, treatment of relatively thick and/or heterogeneous formations to improve water injectivity can increase the water permeability of the more permeable strata without an accompanying improvement in the less permeable strata, resulting in the subsequently injected flood water being even more poorly distributed between the strata.

Hence, need exists for a simple, inexpensive method for treating both relatively uniform and heterogeneous formations adjacent to an injection well to substantially completely remove oil therefrom.

Accordingly, a principal object of the present invention is to improve the water injectivity of an input well in a waterflooding process. Another object of the invention is to provide a process for reducing the oil saturation in that portion of an oil-bearing formation surrounding a water injection well. A still further object of this invention is to provide a simple, inexpensive method for substantially completely removing oil from the formation adjacent to a water injection well. A yet further object of this invention is to provide a method for substantially completely removing oil from relatively thick and/or heterogeneous formation surrounding a water injection well. Other objects and advantages of the invention will be apparent from the following description.

Briefly, this invention contemplates a process for improving the injectivity of water into a subterranean oil-bearing formation by removing the oil from that part of the formation immediately surrounding the well. Oil removal is accomplished by alternately introducing into the well a series of successive small quantities of substantially anhydrous soluble oil and low salt-content water, and thereafter injecting flood water through the well to displace the previously injected fluids outwardly into the formation.

Because of the radial flow system involved in injecting fluids from a well outwardly into a surrounding permeable formation, that portion of the formation immediately adjacent to the well is most critical with respect to restricting the rate of injection of fluid into the formation. Hence, the restriction on the flow of water from the well into the formation due to oil blockage can be substantially reduced by removing oil from only that portion of the formation immediately adjacent to the well. Oil blockage can be effectively minimized by removing oil from the strata of the formation into which water is to be injected to a distance of 5 to 10 feet from the well.

Oil can be removed from an oil-bearing formation by displacement with water down to a residual oil saturation of about 20 to 35 pore volume percent, but cannot be removed below the residual saturation by water displacement alone. Residual oil can be substantially completely removed from the formation adjacent to the well by alternately introducing successive small quantities of soluble oil and low salt-content water into the well, and subsequently injecting flood water to displace the soluble oil outwardly into the formation. By the term "substantially completely removed," as used herein, it is meant that almost all of the residual oil is removed from the formation adjacent to the well. More specifically, it is preferred that the oil content of the formation adjacent to the well be reduced to less than about 5 percent of the pore volume, and more preferably, to less than about 3 percent. Because of the high solvency of the soluble oil for the connate oil, the formation adjacent to the well can be substantially denuded of oil by displacing only a small quantity of soluble oil therethrough.

While the treating process of this invention can be employed to improve the water injectivity of all types of formations surrounding water injection wells that are subject to oil blockage, it has particular utility in treating relatively thick formations, i.e., formations having vertical thicknesses of from about 30 to 1,000 feet, or more. The treating process of this invention also is particularly useful in treating formations having strata of substantially different permeabilities, i.e., formations having strata differing in permeability by 50 millidarcies, or more.

The well stimulation process of this invention also has particular utility in improving the injectivity of both fresh water and brine into oil-bearing subterranean formations. The term "brine" as used herein is meant to include both oil field and synthetic aqueous salt solutions that contain more than about 300 p.p.m. of polyvalent cations; such as the cations of calcium, magnesium, iron, aluminum, copper, zinc, manganese, and the like. While the brines containing high polyvalent ion contents are especially deleterious and adversely affect the ability of the soluble oil to displace oil from the formation, brines containing a relatively high content of other dissolved salts, such as the salts of sodium and potassium, are also deleterious, even though the polyvalent cations are present in an amount less than 300 p.p.m. Thus, in one embodiment, the process of this invention has particular utility in improving the injectivity of brines containing more than about 1.0 weight percent total dissolved salts, or more than about 300 p.p.m. polyvalent cations.

In the practice of this invention, a series of small volumes of substantially anhydrous soluble oil and low salt-content water are alternately introduced into the well, and thereafter floodwater is injected through the well and into the formation. Each separate successive volume of soluble oil is introduced into the well in an amount equivalent to between about 0.1 and 1.5 barrels per foot of vertical thickness of the reservoir in the vicinity of the well, and the low salt-content water following each slug of soluble oil is introduced into the well in an amount equivalent to 0.5 to 1.0 volumes per volume of the immediately preceding increment of soluble oil. Preferably, the soluble oil is introduced into the well in about two to five separate slugs, the size of each slug being selected so that the cumulative volume of soluble oil introduced into the well in the practice of this method does not exceed about 3 barrels per foot of vertical thickness of reservoir, and more preferably, amounts to between about 0.5 and 2 barrels per foot. The number of treating sequences or stages employed in a particular well treatment depends upon the thickness of the formation and the magnitude of the permeability differences encountered. It is preferred that more treating stages be employed in treating relatively thick formations, or where strata of substantially different permeabilities are encountered. Also, advantageous results can be obtained by allowing a soaking period after each treating stage and prior to introducing the next increment of soluble oil. Soaking times of about 1 to 12 hours are usually sufficient to obtain beneficial results. The soaking step is particularly beneficial where the oil in the formation surrounding the injection well contains waxy and/or asphaltic constituents. Where the flood water is a brine, it is preferred that an additional quantity of about 1 to 4 volumes of low salt-content water per total volume of soluble oil be introduced into the well prior to injecting the brine to insulate the soluble oil from the deleterious constituents in the subsequently injected brine.

The soluble oils used herein are oleaginous compositions which are miscible with the connate oil and have the ability to spontaneously emulsify with water when admixed therewith. These soluble oils comprise a liquid hydrocarbon, one or more selected surface active agents, and optionally a stabilizing agent. The emulsions formed by the addition of water to a soluble oil are of the water-in-oil type, in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions in aging. By transparent, it is meant that the microemulsions do not have a cloudy or opaque appearance, even though they contain color bodies. It is recognized, of course, that some cloudiness may appear at certain water concentrations without adversely effecting the utility of the microemulsion in removing oil from that portion of the formation which it contacts. Emulsions of this type are designated microemulsions to distinguish them from ordinary water-in-oil microemulsions in which the lower limit in the size of the water droplets is about 0.1 micron. At water concentrations above the inversion concentration, the emulsion inverts to an emulsion of the oil-in-water type in which droplets of oil are dispersed in a continuous water phase. In most soluble oil systems, the water concentrations employed in the practice of this invention are substantially below the inversion concentration.

One of the major constituents of the soluble oil composition useful in the practice of this invention is a liquid hydrocarbon, which can comprise a crude petroleum oil, such as a crude oil previously recovered from the reservoir, or other conveniently available crude oil; a refined or semirefined petroleum product, such as gasoline, naphtha, stove oil and diesel; a residual product obtained by the distillation of lower boiling fractions from a crude oil, such a bunker fuel oil and other residual products; a low value refinery byproduct, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

Surface active materials which can be used are those that when admixed with the liquid hydrocarbon cause the formation of microemulsions of the water-in-oil type on the subsequent addition of water. Agents which exhibit this property can be defined by their hydrophilic-lipophilic balance and by their spreading coefficients. The hydrophilic-lipophilic balance is an indication of the size and strength of the hydrophilic, or water-loving or polar groups, and the lipophilic, or oil-loving or nonpolar, groups in a surfactant material expressed by a numerical value designated HLB number. The spreading coefficient is an indication of the facility with which one liquid spreads upon another liquid. Spreading coefficients greater than 0 indicate that the first liquid will spread on the second, and coefficients less than 0 indicate that the supernatant liquid will simply form floating lenslike drops. Accordingly, surface active materials, or mixtures of materials possessing the ability to spontaneously emulsify water in oil exhibit average HLB numbers of about 3 to 7, and the most negative spreading coefficient consistent with the system.

A number of surface active materials that exhibit the ability to spontaneously emulsify oil and water to produce water-in-oil microemulsions are commercially available. Among the preferred agents are various preferentially oil-soluble anionic surfactants such as the higher alkyl aryl sulfonates, particularly the alkyl naphthenic monosulfonates. A particularly preferred surface active agent is an alkyl aryl monosulfonate prepared by sulfonation of an aromatic petroleum fraction. These sulfonates are preferably in the form of their sodium salts, however, other salts can be used.

It has been found that superior soluble oil compositions can be prepared by employing as the surface active agent a combination of preferentially oil-soluble organic sulfonates and preferentially water soluble organic sulfonates.

The preferentially oil-soluble surfactant material is an oil-soluble, relatively water-insoluble organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble organic sulfonate that exhibits substantially greater solubility in water than in oil. Some of these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention are oil-soluble alkyl aryl sulfonates that contain only the sulfonic group attached to an alkyl aryl hydrocarbon. The preferentially oil-soluble alkyl aryl sulfonates are those which in the form of their sodium salts have molecular weights of more than about 400. Among the preferred preferentially oil-soluble organic sulfonates are alkyl sodium benzene monosulfonates and alkyl sodium polyaryl monosulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have molecular weights of less than about 400 or which contain more than one sulfonic acid group per molecule. It has been found that in soluble oils compounded from petroleum crude oil or other high-boiling hydrocarbons, superior results are obtained by employing as the preferentially oil-soluble organic sulfonate an alkyl aryl monosulfonate which in the form of its sodium salt has a molecular weight above about 450, and preferably in the range of about 450 to 550.

Thus, the soluble oil compositions of this invention are prepared by admixing into the hydrocarbon a preferentially oil-soluble organic sulfonate, such as alkyl aryl monosulfonate or mixture of monosulfonates which in the form of their sodium salts have molecular weights of more than about 400, and a preferentially water-soluble organic sulfonate, such as an alkyl aryl sulfonate or mixture of sulfonates which in the form of their sodium salts have molecular weights of less than about 400 or which are polysulfonates. Alternatively, a mixture of preferentially water-soluble and preferentially oil-soluble sulfonates can be employed, such as a mixture of alkyl aryl sulfonates which in the form of the sodium salt have an average molecular weight of the range of about 400 to 500.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form the polysulfonates. These sulfonates are preferably in the form of the sodium salt, however other salts can be used.

A readily available source of alkyl aryl sulfonates are the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "petroleum sulfonates" is a commercial designation of sulfonates which are obtained by a treatment of petroleum fractions, particularly solvent treated aromatic fractions, with sulfuric acid, fuming sulfuric acid, or sulfur trioxide, followed by neutralization to form the sulfonates. Upon sulfonation, two types of general products are formed which are designated mahogany acid and green acid. The terminology is based on the colors imparted to the respective oil and water phases produced in the sulfonation process, a brownish color being imparted to the oil phase by oil-soluble sulfonic acids and a greenish color being imparted to the aqueous phase by the water-soluble sulfonic acids. The mahogany acids and the green acids can be neutralized to form mahogany sulfonates and green sulfonates.

The mahogany sulfonates are alkyl aryl sulfonates which usually contain only one sulfonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight or those containing more than one sulfonate group per molecule.

The preferentially oil-soluble surface active material and the preferentially water-soluble surface active material are employed in the proportions of about 1 part of preferentially oil-soluble agent per part of water-soluble agent to about 12 parts of oil-soluble agent per part of water soluble agent. Although the optimum surfactant combination is dependent upon the characteristics of the particular reservoir, in many operations it is found the superior results are obtained with a surfactant combination containing about 1 to 4 parts of preferentially oil-soluble surface active material per part of preferentially water-soluble surface active material per part of preferentially oil-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated organic liquids such as monohydric and polyhydric alcohols, keytones, ethers and polyhydric alkyl ethers. Specific agents found particularly useful include isopropyl alcohol, secondary butyl alcohol, methyl ethyl ketone, glycol monoethyl ether, (cellosolve), glycol monobutyl ether (butyl cellosolve), and diethylene glycol monobutyl ether (butyl carbitol).

The soluble oils employed in the practice of this invention are substantially anhydrous in that they contain little, if any, added water. However, it is well known that some of the ingredients from which soluble oils are compounded, such as the hydrocarbon, the stabilizing agent and the petroleum sulfonates, can contain minor proportions of water and that it is difficult and costly to dehydrate these agents to remove all traces of water. Also, it may be advantageous when compounding the soluble oil to add a small amount of water to the composition. Thus, it is within the scope of this invention to use anhydrous and substantially anhydrous soluble oils in the practice of the invention. The term "substantially anhydrous" as used herein is meant to include soluble oils having not more than minor amounts of water. More particularly, these soluble oils contain less than 10 volume percent water. The substantially anhydrous soluble oils useful in the practice of this invention are to be distinguished from the prior art microemulsions and micellar solutions containing substantial quantities of water, such as from about 10 to 50 percent or more water.

A preferred composition in accordance with this invention useful in removing oil from the formation adjacent the well comprises a mixture of about 52 to 90 volume percent liquid hydrocarbon, such as crude petroleum or other high boiling hydrocarbon; 4 to 30 volume percent of a surface active material, such as alkyl aryl monosulfonate obtained by sulfonation of an aromatic petroleum fraction; 0.5 to 8 volume percent stabilizer; and less than about 10 volume percent water. Also, where the hydrocarbon liquid has a relatively high viscosity, light liquid hydrocarbon can be added to reduce the viscosity of the resulting soluble oil so that it can be more easily displaced into the formation. The light hydrocarbon will usually not constitute more than 25 volume percent of the resulting soluble oil.

The compositions useful in the practice of this invention can be prepared by any of the conventional techniques. One suitable method of preparing these compositions is to first admix the hydrocarbon base stock, surface active material and stabilizer in the desired proportions to form a substantially anhydrous soluble oil. Thereafter, if desired, a small amount of water is added to obtain a microemulsion of the desired water content. Preferably, the water employed in forming the microemulsion is a salt-containing fresh water having a dissolved salt content of less than about 5,000 p.p.m.

The low salt-content water alternately introduced into the well with the soluble oil and, in the case where brine is to be injected through the well, the low salt-content water injected ahead of the brine, preferably contains less than about 1.0 weight percent total dissolved salts and less than about 200 p.p.m. polyvalent cations, and more preferably, a fresh water is employed that contains less than 0.5 weight percent total dissolved salts and less than 150 p.p.m. polyvalent cations. Where the formation into which these fluids are injected is sensitive to fresh water, the fresh water can contain up to about 1.0 weight percent monovalent cations, such as sodium and potassium ions, providing that the concentration of polyvalent cations is maintained below about 200 p.p.m.

In the practice of this invention, the soluble oil composition can be injected into the well either preceding a waterflood, or flood water injection can be interrupted and the soluble oil introduced into the well at any time during the waterflood that it is desired to increase flood water injectivity. In the usual practice of placing a well in water injection service, water injection is first initiated to establish injection profiles and rates. If necessary, water injection is discontinued and the soluble oil treatment initiated. Also, it is usually advantageous to backflow the well to remove loose scale and other deleterious material, and to inject sufficient low salt-content water to flush brine from the well. Thereafter, about 0.5 to 3 barrels of substantially anhydrous soluble oil per foot of vertical thickness of the reservoir is introduced into the well in two to five successive increments alternated with about 0.5 to 1 volume of low salt-content water per volume of the immediately preceding increment of soluble oil. Where the flood water is an oil field or synthetic brine, it is preferred that an additional 1 to 4 volumes of low salt-content water be next introduced into the well. Thereafter, flood water injection is resumed to displace the alternate slugs of soluble oil and low salt-content water from the well outwardly into the formation. Where the water injection has been inhibited by oil blockage in the formation adjacent to the well, this step will be accompanied by an immediate reduction in injection pressure, and/or a corresponding increase in injection rate. Also, where the formation is relatively thick and/or is comprised of strata of varying permeabilities, the treatment of formation with successive slugs of substantially anhydrous soluble oil and low salt-content water improves the distribution of the soluble oil in the formation, resulting in a substantial reduction in oil blockage in all of the strata.

The invention is further described by the following examples which are illustrative of specific modes of practicing the invention and are not intended as limiting the scope of the invention defined by the appended claims.

EXAMPLE 1

A water injection well is treated in accordance with the method of this invention. The well is completed in a reservoir having a vertical thickness of approximately 150 feet and serves as an injection well in a water flooding operation. The flood water is an oil field brine containing 1.24 weight percent total dissolved salts and 55 p.p.m. polyvalent cations. The maximum brine injection rate prior to treatment is 360 barrels per day at a surface pressure of 1,125 p.s.i.g.

Brine injection is discontinued and the following fluids introduced into the well in the indicated sequence:

| Stage | Agent | Quantity Barrels | Barrels/Foot |
|---|---|---|---|
| 1 | Soluble Oil | 75 | 0.5 |
|   | Low salt-content water | 75 | 0.5 |
| 2 | Soluble Oil | 105 | 0.7 |
|   | Low salt-content water | 60 | 0.4 |
|   | Low salt-content water | 180 | 1.2 |
|   | Total soluble oil injected | 180 | 1.2 |
|   | Low salt-content water injected | | |
|   | First stage | 1.0 volumes of water per volume of soluble oil | |
|   | Second stage | 0.57 volumes of water per volume of soluble oil | |
|   | Flush | 1.0 volumes of water per total volume of soluble oil | |

Approximately 1 hour soaking period is allowed after the completion of the first stage injection and before the introduction of the second increment of soluble oil into the well.

The soluble oil employed in this treatment is a substantially anhydrous material having the following composition:

| | Volume Percent |
|---|---|
| Distillate gas oil | 73.1 |
| Mixed alkyl aryl sulfonates | 18.1[1] |
| Butyl cellosolve | 1.8 |
| Water | 7.0 |

(1) Contains 42 weight percent active sulfonates.

The low salt-content water contains 1,100 p.p.m. total dissolved solids and 110 p.p.m. polyvalent cations.

Upon completion of the foregoing treatment, the injection of brine is resumed. The injection rate is stabilized at 615 barrels per day at a surface pressure of 800 p.s.i.g. which represents a substantial improvement over the injection rate prior to treatment.

EXAMPLE 2

A water injection well is treated in accordance with the method of this invention. The well serves as an injection well in a water flooding operation, and is completed in a highly stratified, heterogeneous reservoir having a vertical thickness of approximately 320 feet. The flood water is relatively low salt-content water containing 0.8 weight percent total dissolved salts and 150 p.p.m. polyvalent cations.

Flood water injection is discontinued and the following fluids introduced into the well in the indicated sequence:

| Stage | Agent | Quantity Barrels | Barrels/Foot |
|---|---|---|---|
| 1 | Soluble Oil | 128 | 0.4 |
|   | Low salt-content water | 64 | 0.2 |
| 2 | Soluble Oil | 128 | 0.4 |
|   | Low salt-content water | 64 | 0.2 |
| 3 | Soluble Oil | 128 | 0.4 |
|   | Low salt-content water | 64 | 0.2 |
| 4 | Soluble Oil | 128 | 0.4 |
|   | Low salt-content water | 64 | 0.2 |
| 5 | Soluble Oil | 128 | 0.4 |
|   | Low salt-content water | 64 | 0.2 |
|   | Total soluble oil injected | 640 | 2.0 |

Low salt-content water 0.5 volumes per volume of soluble oil.

The soluble oil employed in this treatment is a substantially anhydrous material having the following composition:

| | Volume Percent |
|---|---|
| Lease crude oil | 69.2 |
| Butyl cellosolve | 6.4 |
| Oil-soluble sulfonate | 14.7[1] |
| Water-soluble sulfonate | 5.7[2] |
| Water | 4.0 |

(1) Contains 52 weight percent active sulfonates.

(2) Contains 30 weight percent active sulfonates.

Flood water available at the well site is employed as a source of low-salt content water.

The flood water injection rate is increased from 285 barrels per day at a surface pressure of 980 p.s.i.g. to 745 barrels per day at 720 p.s.i.g. surface pressure. A spinner survey indicates that all zones are taking water at a rate approximately proportional to their permeability differences.

Various embodiments and modifications of this invention have been described in the foregoing description and examples, and further modifications will be apparent to those skilled in the art. Such modifications are included within the scope of this invention as defined by the following claims.

Having now described the invention, I claim:

1. In the method of recovering oil from heterogeneous subterranean reservoirs having strata differing in permeabilities by at least about 50 millidarcies wherein an aqueous liquid is injected through an injection well and oil is removed from a spaced production well and wherein the injection of said aqueous liquid is restricted by the presence of oil in the reservoir adjacent to the injection well, the improvement which comprises alternately introducing into said well a series of successive quantities of substantially anhydrous soluble oil and low salt content water, each of said successive quantities of soluble oil amounting to between about 0.1 to 1.5 barrels per foot of vertical thickness of said reservoir, and thereafter resuming the injection of said aqueous liquid.

2. The method defined in claim 1 wherein said soluble oil is comprised of a major proportion of liquid hydrocarbon, amounts of alkyl aryl sulfonate and partially oxygenated organic liquid stabilizing agent effective to form stable emulsions on the addition of water to the soluble oil, and less than about 10 volume percent water.

3. The method defined in claim 1 wherein said soluble oil is comprised of about 52 to 90 volume percent liquid hydrocarbon, about 4 to 30 volume percent petroleum sulfonates, about 0.5 to 8 volume percent partially oxygenated organic liquid stabilizing agent, and less than about 10 volume percent water.

4. The method defined in claim 1 wherein two to five separate quantities of substantially anhydrous soluble oil are introduced into the injection well.

5. The method defined in claim 1 wherein said low salt-content water is injected in an amount equivalent to 0.5 to 1.0 volumes per volume of said immediately preceding increment of soluble oil.

6. The method defined in claim 1 wherein said low salt-content water contains less than about 1.0 weight percent total dissolved salts and less than about 220 p.p.m. polyvalent cations.

7. In the method of recovering oil from a heterogeneous subterranean reservoir having strata differing in permeabilities by at least about 50 millidarcies wherein an aqueous liquid is injected through an injection well and oil is recovered from a spaced production well and wherein the injection of said aqueous liquid is restricted by the presence of oil in the reservoir adjacent to the injection well, the improvement which comprises alternately introducing into said injection well in two to five successive increments alternated with low salt-content water about 0.5 to 3 barrels of substantially anhydrous soluble water oil per foot of vertical thickness of said reservoir, said low salt-content water being introduced into said injection well in an amount equivalent to 0.5 to 1.0 volumes per volume of said immediately preceding increment of soluble oil; and thereafter resuming the injection of said aqueous liquid.

8. The method defined in claim 7 wherein said soluble oil is comprised of about 52 to 90 volume percent liquid hydrocarbon, about 4 to 30 volume percent petroleum sulfonates, about 0.5 to 8 volume percent partially oxygenated organic liquid stabilizing agent, and less than about 10 volume percent water.

9. The method defined in claim 7 wherein said low salt-content water contains less than about 1.0 weight percent total dissolved salts and less than about 200 p.p.m. polyvalent cations.

10. The method defined in claim 7 including the introduction into said injection well following said soluble oil of about 1 to 4 volumes of low salt content water per total volume of said soluble oil introduced into said well.

11. In the injection of flood water through an injection well and into a heterogeneous subterranean reservoir having a thickness of more than about 30 feet and having strata differing in permeability by at least about 50 millidarcies and containing oil that restricts the flow of flood water from said well into the reservoir, the improvement which comprises introducing into said injection well in 2 to 5 successive increments alternated with low salt-content water about 0.5 to 3 barrels of substantially anhydrous soluble oil per foot of vertical thickness of said reservoir, said soluble oil containing less than about 10 volume percent water and said low salt-content water being introduced into the well in an amount equivalent to about 0.5 to 1.0 volumes per volume of the immediately preceding increment of soluble oil; and thereafter injecting flood water through said well and into said formation.

12. A method for increasing the injection rate of flood water into a porous subterranean oil-bearing reservoir having a vertical thickness in excess of about 30 feet and having strata differing in permeability by at least about 50 millidarcies penetrated by an injection well wherein the flow of flood water into the reservoir is restricted by residual oil in the reservoir immediately surrounding the injection well, which comprises:

introducing into said injection well, in two to five successive increments alternated with low salt-content water containing less than about 1.0 weight percent total dissolved salts and less than 200 p.p.m. polyvalent cations, about 0.5 to 3 barrels of substantially anhydrous soluble oil per foot of vertical thickness of said reservoir said soluble oil comprising about 52 to 90 volume percent liquid hydrocarbons, about 4 to 30 volume percent alkyl aryl sulfonates about 0.5 to 8 volume percent partially oxygenated organic liquid stabilizing agent, and less than about 10 volume percent water, and said low salt-content water being introduced into said well in an amount equivalent to about 0.5 to 1 volume of water per volume of said immediately preceding increment of soluble oil;

next introducing into said well about 1 to 4 volumes of said low salt-content water per total volume of said soluble oil introduced into said well; and thereafter injecting flood water through said injection well and into said reservoir.

13. A method for improving the injectivity of water into a porous subterranean oil-bearing formation having a vertical thickness in excess of about 30 feet and having strata differing in permeability by at least about 50 millidarcies penetrated by an injection well, which comprises:

injecting water through said injection well and into said formation at a first injection rate;

discontinuing the injection of said water;

introducing into said injection well in two to five successive increments alternated with low salt-content water about 0.5 to 3 barrels of substantially anhydrous soluble oil per foot of vertical thickness of said reservoir, said low salt-content water being introduced into said well in an amount equivalent to about 0.5 to 1 volume of said water per volume of said immediately preceding increment of soluble oil; and thereafter injecting water through said injection well and into said reservoir at an injection rate higher than said first injection rate.

14. The method defined in claim 13 wherein the water injected into said well is brine and wherein there is introduced into said injection well after the last increment of soluble oil and immediately preceding the subsequently injected water about 1 to 4 volumes of low salt-content water per total volume of said soluble oil introduction into said well.

15. The method defined in claim 13 wherein said low salt-content water contains less than about 1.0 weight percent total dissolved salts and less than about 200 p.p.m. polyvalent cations.

* * * * *